(12) United States Patent  
Tsung et al.

(10) Patent No.: US 9,830,731 B2  
(45) Date of Patent: Nov. 28, 2017

(54) METHODS OF A GRAPHICS-PROCESSING UNIT FOR TILE-BASED RENDERING OF A DISPLAY AREA AND GRAPHICS-PROCESSING APPARATUS

(71) Applicant: MediaTek Inc., Hsin-Chu (TW)

(72) Inventors: Pei-Kuei Tsung, New Taipei (TW); Sung-Fang Tsai, Hsinchu (TW); Ming-Hao Liao, Hsinchu (TW); Yang-Yao Lin, Caotun Township, Nantou County (TW); Ken-Fu Liang, Kaohsiung (TW); Chun-Shen Liu, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 77 days.

(21) Appl. No.: 15/075,041

(22) Filed: Mar. 18, 2016

(65) Prior Publication Data

US 2016/0379336 A1 Dec. 29, 2016

Related U.S. Application Data

(60) Provisional application No. 62/183,250, filed on Jun. 23, 2015.

(51) Int. Cl.
*G06T 15/00* (2011.01)
*G06T 11/40* (2006.01)
*G06F 9/50* (2006.01)

(52) U.S. Cl.
CPC .............. *G06T 15/005* (2013.01); *G06F 9/50* (2013.01); *G06T 11/40* (2013.01)

(58) Field of Classification Search
CPC ............................. G06T 11/40; G06T 15/005
USPC .......................................................... 345/419
See application file for complete search history.

(56) References Cited

U.S. PATENT DOCUMENTS

| 8,692,848 | B2 * | 4/2014 | Adams | G06T 11/40 |
| | | | | 345/426 |
| 8,830,246 | B2 * | 9/2014 | Seetharamaiah | G06T 1/20 |
| | | | | 345/522 |
| 2011/0016357 | A1 * | 1/2011 | Tsvetkov | G06F 11/3636 |
| | | | | 714/38.1 |
| 2014/0317626 | A1 * | 10/2014 | Chung | G06F 9/3851 |
| | | | | 718/101 |

* cited by examiner

*Primary Examiner* — Jacinta M Crawford
(74) *Attorney, Agent, or Firm* — McClure, Qualey & Rodack, LLP

(57) ABSTRACT

A method of a graphics-processing unit (GPU) for tile-based rendering of a display area and a graphics-processing apparatus are provided. The method includes the steps of computing vertex positions of a plurality of vertexes, wherein the first vertex corresponds to a first thread and the second vertex corresponds to a second thread; determining whether a thread merge condition is satisfied; merging the first thread and the second thread to a thread group when determining that the thread merge condition is satisfied; computing vertex varyings of the plurality of vertexes, wherein when the first thread and the second thread are merged to the thread group, a varying of the first vertex and a varying of the second vertex are computed with respect to a program counter.

16 Claims, 9 Drawing Sheets

METHODS OF A GRAPHICS-PROCESSING UNIT FOR TILE-BASED RENDERING OF A DISPLAY AREA AND GRAPHICS-PROCESSING APPARATUS

CROSS REFERENCE TO RELATED APPLICATIONS

This application claims the benefit of U.S. Provisional Application No. 62/183,250, filed on Jun. 23, 2015, the entirety of which is/are incorporated by reference herein.

This application is related to co-pending and commonly assigned U.S. patent application Ser. No. 14/675,759, filed on Apr. 1, 2015, entitled "GRAPHICS PROCESSING METHOD AND GRAPHICS PROCESSING APPARATUS", which application is hereby incorporated by reference in its entirety.

BACKGROUND OF THE INVENTION

Field of the Invention

The invention generally relates to a method of a graphics-processing unit (GPU) for tile-based rendering of a display area, and more particularly, to determining whether to merge the thread when computing vertex varyings of the vertexes.

Description of the Related Art

A conventional portable electronic device such as a conventional mobile phone may have a processor (e.g. a central processing unit (CPU)) to control the operations of the conventional portable electronic device. It may also have a conventional GPU to perform graphics-related calculations. According to the related art, the conventional GPU is suitable for conventional immediate rendering technologies or conventional tile-based rendering (TBR) technologies.

When the conventional GPU performs graphics-related calculations, the conventional GPU may adopt Single Instruction Multiple Data (SIMD) architecture. However, in SIMD architecture, some problems may occur. For example, the SIMD architecture need to allocate a group for the same thread, therefore the vertex shader in the rendering phase may drop the shader efficiency because of the computation granularity.

Therefore, avoiding above problem is a subject worthy of discussion for saving memory usage and bandwidth.

BRIEF SUMMARY OF THE INVENTION

Methods of a graphics-processing unit (GPU) for tile-based rendering of a display area and graphics-processing apparatus are provided to overcome the problems mentioned above.

An embodiment of the invention provides a method of a graphics-processing unit (GPU) for tile-based rendering of a display area. The method comprises the steps of computing vertex positions of a plurality of vertexes, wherein the first vertex corresponds to a first thread and the second vertex corresponds to a second thread; determining whether a thread merge condition is satisfied; merging the first thread and the second thread to a thread group when determining that the thread merge condition is satisfied; computing vertex varyings of the plurality of vertexes, wherein when the first thread and the second thread are merged to the thread group, a varying of the first vertex and a varying of the second vertex are computed with respect to a program counter. In the embodiment, the thread merge condition is satisfied if the first thread and the second thread belong to the same draw call, or a shader code assembly of the first thread is identical to a shader code assembly of the second thread and hardware settings of the first thread are identical to hardware settings of the second thread.

In the embodiment of the invention, the method comprises the step of recording the draw call information of the first thread and the draw call information of the second thread when determining that the thread merge condition is satisfied and the first thread and the second thread belong to different draw calls or tile information of the first thread and tile information of the second thread when determining that the thread merge condition is satisfied and the first thread and the second thread correspond to different tiles of the display area. In the embodiment of the invention, the method comprises the step of recording a shading stage of the first thread and a shading stage of the second thread when determining that the thread merge condition is satisfied and the shading stage of the first thread is different from the shading stage of the second thread.

In the embodiment of the invention, the graphics-processing apparatus further comprises a memory unit. The memory unit is configured to record the draw call information of the first thread and the draw call information of the second thread when determining that the thread merge condition is satisfied and the first thread and the second thread belong to different draw calls, or configured to record tile information of the first thread and tile information of the second thread when determining that the thread merge condition is satisfied and the first thread and the second thread correspond to different tiles of the display area. The memory unit is further configured to record a shading stage of the first thread and a shading stage of the second thread when the first checking unit determines that the thread merge condition is satisfied and the shading stage of the first thread is different from the shading stage of the second thread, wherein the shading stage of the first thread and the shading stage of the second thread each corresponds to one of the binning phase and the rendering phase.

An embodiment of the invention provides a graphics-processing apparatus. The graphics-processing apparatus comprises at least one vertex shader, a first checking unit, and a thread-merge logic circuit. The at least one vertex shader is configured to compute vertex positions of a plurality of vertexes and compute vertex varying of the plurality of vertexes, wherein the first vertex corresponds to a first thread and the second vertex corresponds to a second thread. The first checking unit is configured to determine whether a thread merge condition is satisfied, wherein the thread merge condition is satisfied when the first thread and the second thread belong to the same draw call or when a shader code assembly of the first thread is identical to a shader code assembly of the second thread and hardware settings of the first thread are identical to hardware settings of the second thread. The thread merge logic circuit is configured to merge the first thread and the second thread to a thread group when the thread merge condition is satisfied, wherein when the first thread and the second thread are merged to the thread group, the at least one vertex shader computes a varying of the first vertex and a varying of the second vertex with respect to a program counter.

Other aspects and features of the invention will become apparent to those with ordinary skill in the art upon review of the following descriptions of specific embodiments of methods and apparatus.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
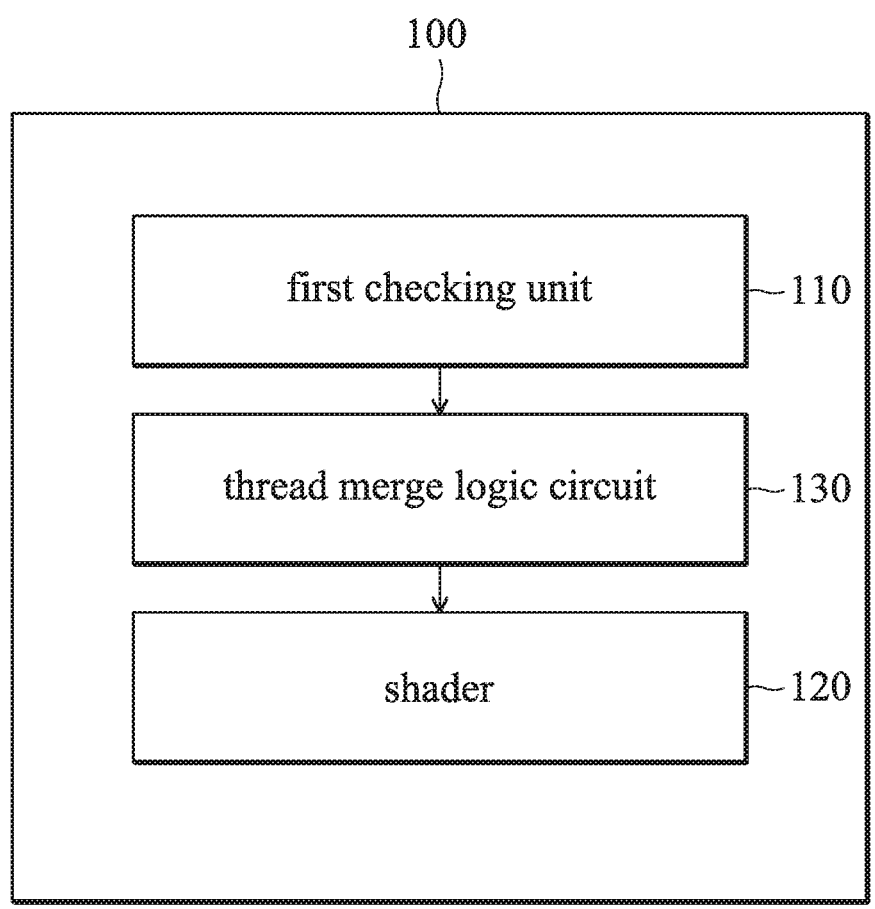
FIG. 1 is a block diagram of a multiprocessor system 100 for assigning tasks according to an embodiment of the invention.

FIG. 1 is a block diagram of a graphics-processing apparatus 100 according to an embodiment of the invention. The graphics-processing apparatus 100 may be positioned within an electronic device, and the graphics-processing apparatus may comprise at least one portion (e.g. a portion or all) of the electronic device, wherein the electronic device may be a mobile phone, a smartphone, a tablet computer, a notebook, a personal digital assistant (PDA) and so on. As shown in FIG. 1, the graphics-processing apparatus 100 comprises a first checking unit 110, one or more shaders, which can be collectively referred to as the shader 120, and a thread merge logic circuit 130. FIG. 1 presents a simplified block diagram in which only the elements relevant to the invention are shown. However, the invention should not be limited to what is shown in FIG. 1.

In an embodiment of the invention, the first checking unit 110 is configured to determine whether a thread merge condition is satisfied. The first checking unit 110 is coupled to the shader 120 and the thread merge logic circuit 130. In an embodiment of the invention, the thread merge condition is satisfied if one thread and another thread belong to the same draw call. By using the term belonging to the same draw call, it means that the proposed embodiment can combine or merge the tiles, lists or threads. In another embodiment of the invention, the thread merge condition is satisfied if a shader code assembly of one thread is identical to a shader code assembly of another thread, and hardware settings of one thread are identical to hardware settings of the other thread. The detail of the merge operation will be discussed in following paragraphs.

In an embodiment of the invention, the aforementioned shader may be implemented with a plurality of vertex shaders (VSs) arranged for playing different roles in graphics processing (or performing different shading operations). In another embodiment of the invention, the aforementioned shader may be implemented with at least one unified VS (e.g. one or more VSs) arranged for playing different roles (or performing different shading operations). The shader 120 is configured to compute vertex positions of a plurality of vertexes and compute vertex varying of the plurality of vertexes.

Figure 2:
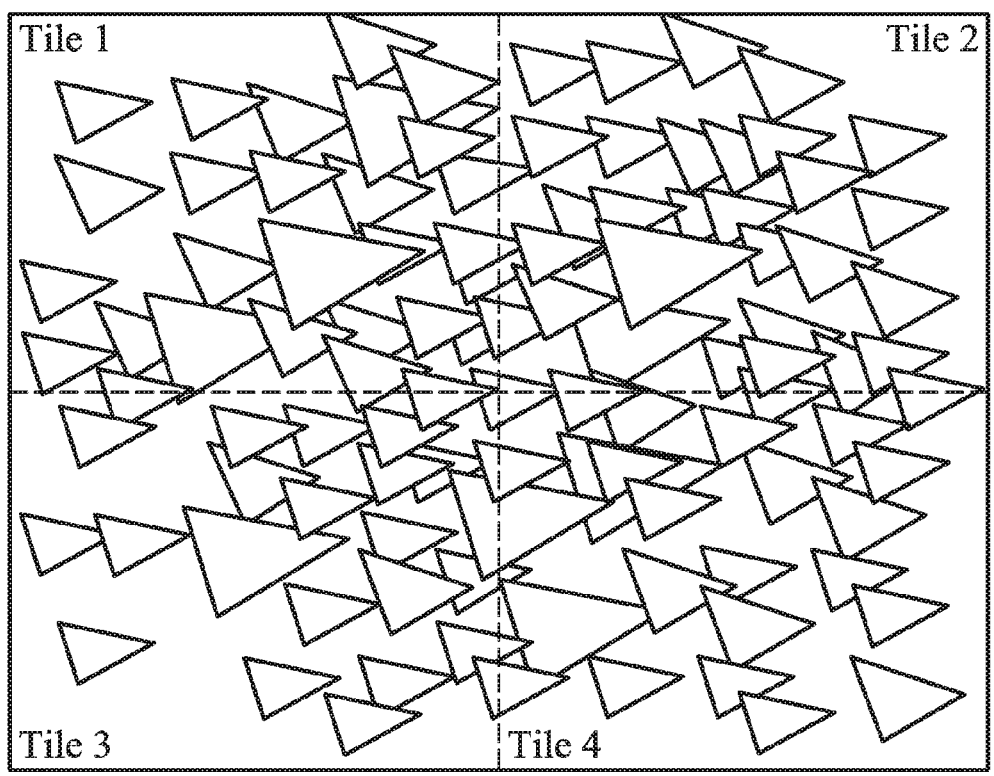
FIG. 2 illustrates at least one portion (e.g. a portion or all) of a set of vertexes to be rendered according to an embodiment of the invention.

FIG. 2 illustrates at least one portion (e.g. a portion or all) of a set of vertexes to be rendered according to an embodiment of the invention. There may be many vertexes within the set of vertexes of this embodiment. For example, the number of vertexes within this set of vertexes may be greater than one hundred. In another example, the number of vertexes within this set of vertexes may be greater than one thousand. In some examples, the number of vertexes within this set of vertexes may be greater than ten thousand or more. Please note that the vertexes of this embodiment may have small sizes, and most of these vertexes may touch only one tile of the plurality of tiles Tile1, Tile2, Tile3, and Tile4.

Figure 3:
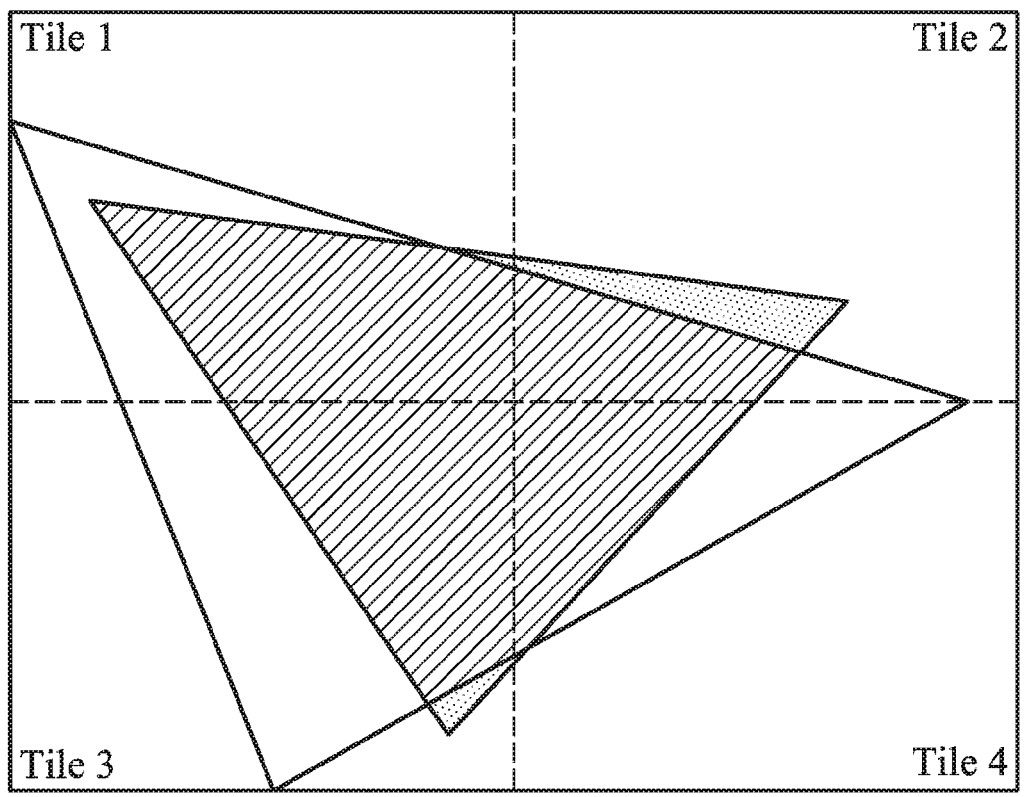
FIG. 3 illustrates at least one portion (e.g. a portion or all) of another set of vertexes to be rendered according to an embodiment of the invention.

FIG. 3 illustrates at least one portion (e.g. a portion or all) of another set of vertexes to be rendered according to an embodiment of the invention. The number of vertexes within the set of vertexes of the embodiment shown in FIG. 3 may be much less than the number of vertexes within the set of vertexes of the embodiment shown in FIG. 2. Please note that one or more vertexes within the set of vertexes of this embodiment may have large size(s), and may touch most of the plurality of tiles Tile1, Tile2, Tile3, and Tile4, such as all of the plurality of tiles Tile1, Tile2, Tile3, and Tile4.

Note that in some embodiments of the invention, these embodiments may focus on interactions between VS operations, such as interactions between operations of different physical VSs or interactions between operations of different VS roles (or roles of VS) played by the same physical VS (e.g. a unified shader). Thus, some shaders described hereinafter, such as the shaders VS0, VS1, and VS2, should be interpreted based on a functional view point, and the shaders VS0, VS1, and VS2 may be directed to calculations regarding vertexes. For example, the shader VS0 may be interpreted as a VS role played by a physical VS to calculate positions of a vertex according to attributes, and the shaders VS1 and VS2 may be interpreted as two VS roles played by this physical VS to calculate the varying of the vertex according to attributes, respectively. In other words, there may be only one physical VS (or only one set of physical hardware), and the one physical VS may simultaneously or time-divisionally perform operations of the VS roles VS0, VS1, and VS2, in parallel.

Figure 4:
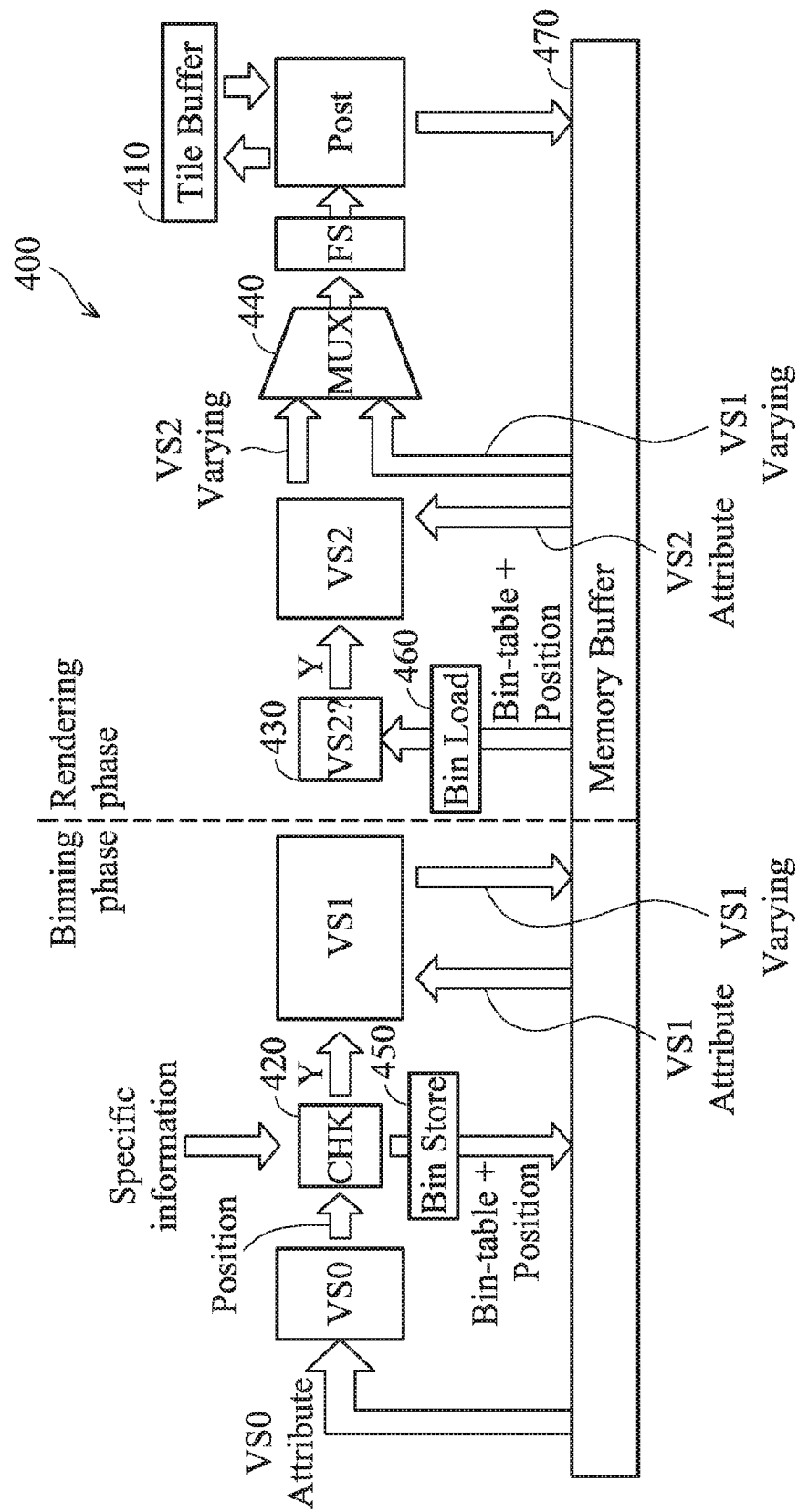
FIG. 4 is a schematic diagram involved with a graphics-processing apparatus 400 according to an embodiment of the invention.

FIG. 4 illustrates an adaptive vertex shading control scheme according to an embodiment of the present invention. For example, the architecture 400 shown in FIG. 4 may be arranged for performing adaptive vertex shading scheduling in a graphics processing pipeline, such as a TBR pipeline, etc., where the graphics processing pipeline may be a GPU pipeline. For better comprehension, the left half of FIG. 4 is labeled "Binning phase", and the right half of FIG. 4 is labeled "Rendering phase". This is for illustrative purposes only, and is not meant to be a limitation of the present invention.

As shown in FIG. 4, the architecture 400 may comprise a set of shaders {VS0, VS1, VS2, FS, Post} and a tile buffer 410, and comprise a checking circuit 420, a selective pass circuit 430, a multiplexing circuit 440, a bin store circuit

450, and a bin load circuit 460 (respectively labeled "CHK", "VS2?", "MUX", "Bin Store", and "Bin Load" in FIG. 4, for brevity), and may further comprise a memory buffer 390, where the checking circuit 420 can be taken as an example of the checking circuit 110, and the set of shaders {VS0, VS1, VS2, FS, Post} can be taken as an example of the aforementioned at least one shader such as the shader 120. For example, the set of shaders {VS0, VS1, VS2, FS, Post}, the checking circuit 420, the selective pass circuit 430, the multiplexing circuit 440, the bin store circuit 450, and the bin load circuit 460 may be positioned in the GPU mentioned in the embodiment shown in FIG. 1, and the memory buffer 390 may be positioned outside the GPU, where the tile buffer 410 may be selectively implemented within or outside the GPU.

According to this embodiment, the set of shaders {VS0, VS1, VS2, FS, Post} may play a plurality of roles in the graphics processing pipeline, respectively, to complete the rendering result(s) of the rendering operation. For example, the shader VS0 may be arranged for loading some attributes (which can be referred to as the VS0 attributes in this example) of the primitive, and performing position processing to generate positions of the vertices of the primitive. In another example, the shader VS1 may be arranged for loading some attributes (which can be referred to as the VS1 attributes in this example) such as some inputs for the shader VS1, and computing some varyings and outputting these varyings (which can be referred to as the VS1 varyings in this example), where these varyings can be taken as an example of the vertex varyings computed in the binning phase. In another example, the shader VS2 may be arranged for loading some attributes (which can be referred to as the VS2 attributes in this example) such as some inputs for the shader VS2, and computing some varyings and outputting these varyings (which can be referred to as the VS2 varyings in this example), where these varyings can be taken as an example of the vertex varyings computed in the rendering phase. In some examples, the shader FS may be arranged for performing fragment shading according to the inputs thereof (e.g. the varyings received by one of the two input of the multiplexing circuit 440, such as the VS1 varyings or the VS2 varyings) to generate some fragment shading results, and outputting these fragment shading results, and the shader Post may be arranged for performing post processing to complete the rendering result(s) of the rendering operation, where the shader Post may access the tile buffer 410 when needed.

In addition, the checking circuit 420 may control the data flow of the graphics processing pipeline with aid of the selective pass circuit 430, the multiplexing circuit 440, the bin store circuit 450, and the bin load circuit 460, where the selective pass circuit 430 and the multiplexing circuit 440 may operate under control of the checking circuit 420. More particularly, the checking circuit 420 may be arranged for providing the determination result (e.g. the tag information) according to the specific information (e.g. bounding box or other information as mentioned above in describing the determination result), to control the data flow of the graphics processing pipeline by utilizing one of a plurality of configurations of the architecture 400 (more particularly, the plurality of configurations of the graphics processing pipeline). As a result, the checking circuit 420 may check whether it is needed to compute the current vertex (e.g. one of the vertices of the primitive) in a first set of processing stages (e.g. the binning phase), or a second set of processing stages (e.g. the rendering phase), of the graphics processing pipeline. For example, when it is determined that the architecture 400 should compute the current vertex in the first set of processing stages (e.g. the binning phase), the checking circuit 420 may turn on (or enable) the shader VS1 and turn off (or disable) the shader VS2, and may correspondingly enable or disable the associated data paths, respectively. In another example, when it is determined that the architecture 400 should compute the current vertex in the second set of processing stages (e.g. the rendering phase), the checking circuit 420 may turn off (or disable) the shader VS1 and turn on (or enable) the shader VS2, and may correspondingly disable or enable the associated data paths, respectively.

Additionally, the bin store circuit 450 may be arranged for storing bin-table and positions for each vertex of the vertices of the primitive and/or for each primitive of all primitives in the whole frame when needed, and the bin load circuit 460 may be arranged for loading this bin-table and these positions when needed. According to the architecture 400, the apparatus 100 may re-order the VS1 or VS2 varyings after the shader VS2 (e.g. in the last few stages of the graphics processing pipeline, such as one or more of the shaders FS and Post) when needed. Please note that, in a situation where the checking circuit 420 turns on (or enables) the shader VS1, the checking circuit 420 may bypass the positions generated by the shader VS0 (such as the positions labeled "Y" in this example) to the next stage such as the shader VS1, and the shader VS1 may also bypass these positions when needed.

According to some embodiments, in general, any of the shaders VS1 and VS2 can be replaced by an attribute processing circuit. Examples of the function of the attribute processing circuit may include, but not limited to, calculating attributes according to vertices, and processing attributes. For example, the attribute processing circuit can be any fixed function circuit or shader, arranged for processing attributes.

According to some embodiments, the shader Post can be replaced by any of another type of circuits, such as a fixed function circuit.

Note that the apparatus 100 may re-order the VS1 or VS2 varyings after the shader VS2 because the shader VS2 follows the bin order, not the draw call order. The efficiency of shader VS2 in the PP phase may be degraded severely due to the computation granularity. To improve the efficiency of the apparatus 100, a proposed thread merging method and corresponding architecture is discussed in following.

In one embodiment, the thread grouping criterion in shader follows the requirements:
 1. Threads in the same frame or the same sub-frame
 2. Threads in the same list (draw call). Threads in the same list means the threads shares the same global setting including at least one of the shader code assembly, the hardware global register value, data buffer configuration and the constant value.
 3. Threads in the same bin (tile).

Note that the above requirements are determined by executing program. To improve the efficiency of the apparatus 100, another embodiment provides mechanism for merging threads does not meet the requirements above and the merging mechanism is implemented by hardware. To achieve the object, another shader architecture including corresponding merge-split pipeline may be required, but not necessary in some situations.

Figure 5:
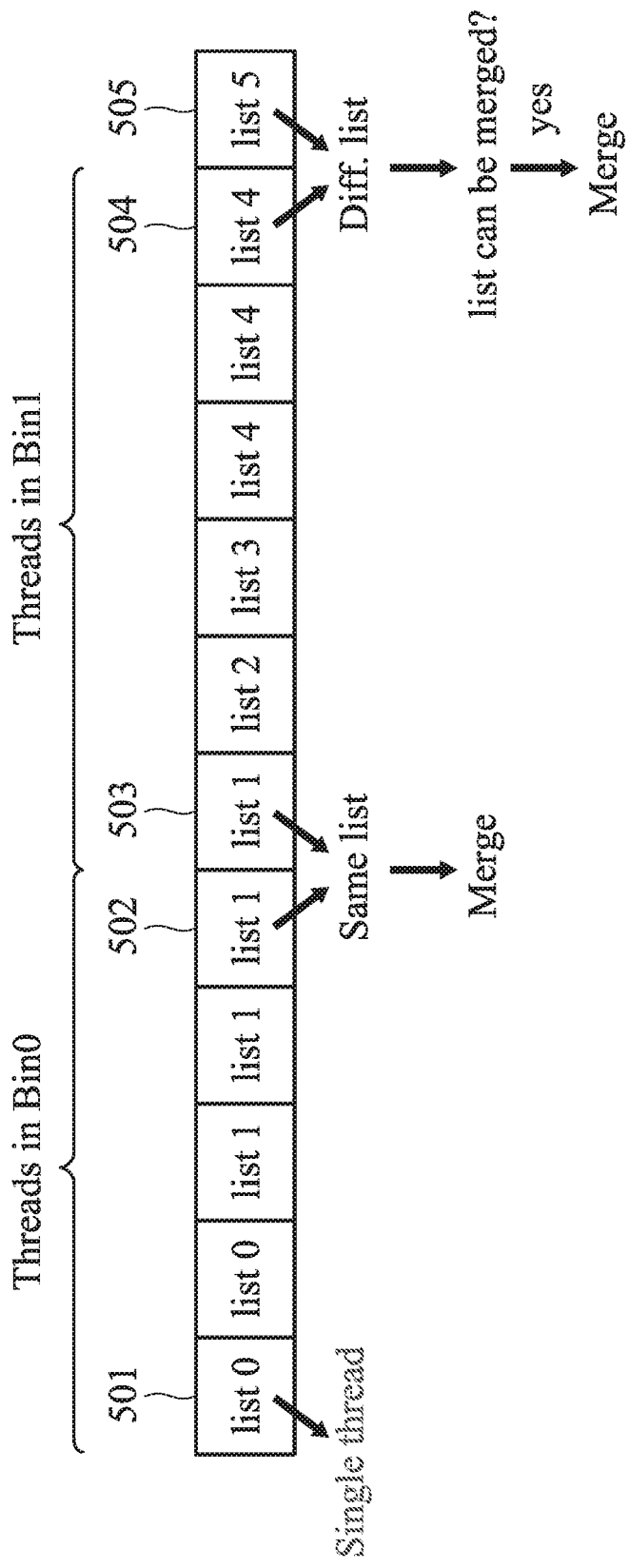
FIG. 5 shows a schematic diagram of a thread-merging mechanism according to an embodiment of the invention.

Please refer to FIG. 5. FIG. 5 shows a schematic diagram of a thread-merging mechanism according to an embodiment of the invention. In FIG. 5, each block, such as block 501, corresponds to one thread. The word, such as list 0, labeled in each block represents which list the thread belongs to. In this embodiment, each list corresponds to one draw call for drawing different object on the frame. For each object, each draw call is separated and processed independently in hardware. If one draw call contains a small number of vertexes, the hardware resource may be wasted. To ensure the hardware operates efficiently, the proposed thread-merging mechanism is provided to improve the hardware efficiency, especially to draw calls with fewer different updated data.

However, not all the draw calls are mergeable. To merge the draw calls, the draw call to be merged must meet some requirement, such as the same global settings. Furthermore, the thread-merging mechanism is not limited to draw calls, the threads in different bin or different list may be mergeable. The thread-merging mechanism is discussed in following paragraph.

Cross-Bin Thread Merging

When a checking module or checking unit determines that a last thread of a current bin is equal to a first thread of a following bin, a merging module or a merging unit merges two threads. In this embodiment, the term "equal to" means the list of the corresponding threads are the same or to be judged the same. For example, one object shown on a frame needs at least two lists for complete drawing the object, thus, the at least two lists are judged to be the same and are determined to be mergeable. In conclusion, the merging condition of the embodiment is to determine whether a last thread of a current bin and a first thread of a following bin are belonged to the same list.

For example, the thread in block 505 and the thread in block 506 are belonged to the same list, list 1. Although the thread in block 505 and the thread in block 506 are belonged to different bin, the proposed thread-merging mechanism merges the thread in block 505 and the thread in block 506, and the merged thread is processed in Bin0.

Cross-List Thread Merging

Since the GPU shader is a SIMD architecture, the shader code assembly in the same wavefront may be the same. However, the constant values, input data, data buffer for each shader code assembly may be different. Since the shader code assembly may be the same, and if the shader code assembly is the same and the shader code assembly is able to process more data, the threads in different lists, i.e., the draw calls, can be merged for processing. To achieve the cross-list thread merging, a check module, such as the first checking module 101, first determines whether the shader code assemblies of the different lists are the same, and whether the hardware globe settings are the same, and only when the both requirements are met, the threads in different lists are merged. In another embodiment, the check module only determines whether the shader code assemblies of the different lists are the same, and when the requirement is met, the threads in different lists are merged.

Table 1 provides a detailed description of the globe hardware settings.

TABLE 1

| Hardware Setting | Description |
| --- | --- |
| Instruction Code | Shader program instruction code must be the same to execute together. |
| Primitive Type | Different primitive type (triangle, point) may have specific process in shader. (Ex: default value, size, etc.) |
| input attribute setting, type, and layout output varying setting, | Input attribute/Output varying type & memory layout (pitch, bit width) must be the same to let shader code run correctly. |

TABLE 1-continued

| Hardware Setting | Description |
| --- | --- |
| type, and layout const/uniform memory organization | Constant value/uniform memory layout must be the same for shader code addressing. |
| Mathematical precision/ rounding mode/ Performance Hint | Due to hardware execution unit capability, required mathematical accuracy and rounding must be the same. |
| Vertex Buffer Base | The vertex used should be placed in the same buffer; otherwise extra overhead would rise. |
| Texture Format & filtering setting | Texture unit should support only one addressing & filter setting; Otherwise, hardware cost may up. |
| Application Process | To have better hardware visualization protection & DRM, different application process should not enter at the same time to prevent complexity of memory management. |
| Set of Standard API | Required process for different API set may differ. We should not merge them. |

Note in table 1, the check module determines whether the shader code assemblies of the different lists are the same according to the Instruction Code of the globe hardware settings. Furthermore, since the data buffer or the constant value of the lists-to-be-merged is not necessarily to be the same. Thus, in some conditions, if the const/uniform memory organization of the globe hardware settings of the lists-to-be-merged is different, the lists will be considered to be mergeable.

The thread merge condition further comprises other merging criteria, as shown in Table 2.

TABLE 2

| Merging Criteria | Description |
| --- | --- |
| No Cross-Thread Synchronization | Synchronization becomes costly if input vertex is highly fragmented. |
| On-chip performance monitor not enable | Merging draw call will cause incorrect performance analysis result. |
| On-chip debug feature is not enabled | Merging draw call will cause un-predictable behavior on crossing draw call such as per draw call memory dump. |
| output buffer size not exceed | If the output buffer requirement is too large, it may cause deadlock or extra external bandwidth. |

In one embodiment, the information shown in table 1 is stored in one memory unit and the check module accesses the memory unit to retrieve the information to determine whether threads are mergeable. The merging criteria of Table 2 shows the conditions that the threads are mergeable, and only at least one merging criteria is met, the threads are merged by a merging unit of the GPU. Take the merging criteria on-chip debug feature for example. The cross-list merging mechanism is not allowed in the default setting of the graphic processing apparatus because the draw call merging may cause unpredictable errors.

Cross-Shader Thread Merging

Figure 6:
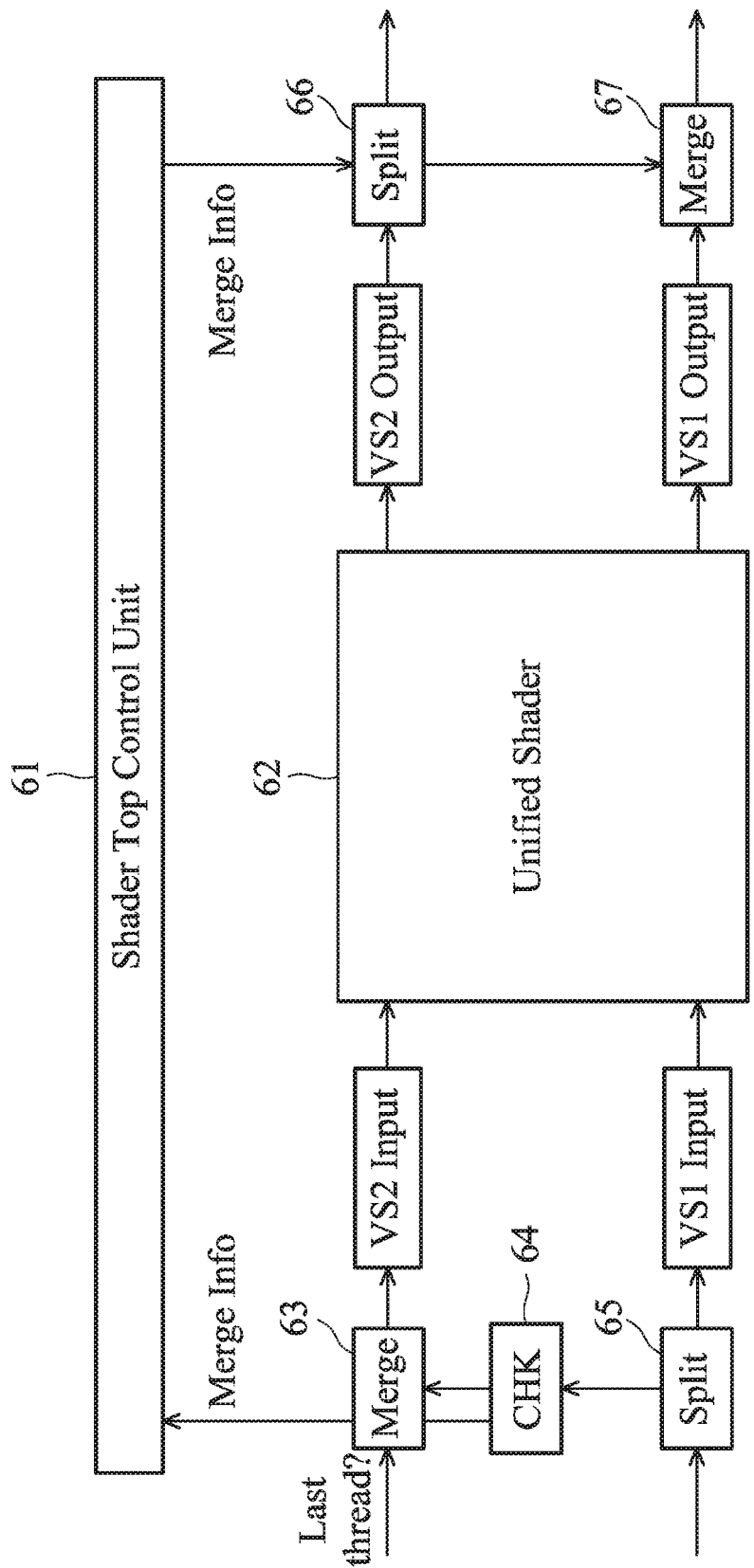
FIG. 6 is a proposed shader architecture of a graphics-processing apparatus according to an embodiment of the invention.

Since the shaders VS1 and VS2 of FIG. 4, for example, are the same computational engine or implemented by the same unified shader in different scheduling, the shaders may be merged to be run together. Since the shader VS1 follows the draw call data order and has no granularity issue, the threads to be processed by the shader VS1 can be merged with the threads to be processed by the shader VS2 to improve the utilization of the shader VS2. Please refer to FIG. 6. FIG. 6 is a proposed shader architecture of a graphics-processing apparatus according to an embodiment of the invention. In the original default setting, first threads are processed by the shader VS1 and second threads are processed by the shader VS2. In one general condition, the amount of the second threads is less than the amount of the first threads, and it means that the shader VS2 may have the capability for processing more threads. The cross-shader thread merging mechanism is achieved based on the possibility.

First, the check unit 64 checks the whether the shader VS1 and the shader VS2 are mergeable. Then, the threads for the shader VS2 first transmits to the first merge unit 63 and the check unit 64 determines whether a last thread for the shader VS2 existed and the shader VS2 is able to process more threads. If yes, the check unit 64 informs the first split unit 65 to split threads, which are configured to be originally processed by the shader VS1, into to two parts, wherein one part of the threads is served as the VS1 input and processed by the shader VS1, and the other part of the threads and the threads to be processed by the shader VS2 are merged to form a merged VS2 input by the first merge unit 63. The first merge unit 63 further transmits the merging information to a shader top control unit 61.

In this embodiment, the unified shader 62 may be a hardware implemented circuit or a computation engine executed by a graphic processing chip, and plays roles of the shader VS1 and the shader VS2 at different time point. The shader top control unit 61 is another control circuit in the graphics-processing apparatus.

The unified shader 62 first processes the VS1 input and then processes the VS2 input. The shader top control unit 61 transmits the merging information to the second split unit 66 and the second merge unit 67. When the VS1 output is generated, the VS1 output is transmitted to the second merge unit 67, and not output to a post processing stage until receiving other data from the second split unit 66. When the VS2 output is generated, the second split unit 66 splits the VS2 output into two parts, wherein one part of the VS2 output belonged to the original VS2 input and is transmitted to the post processing stage, and another part of the VS2 output, which is belonged to threads of original VS1 input, is transmitted to the second merge unit 67. The second merge unit 67 merges the VS1 output and data from the second split unit 66 to generate a merged VS1 output corresponding to the original first threads, and the merged VS1 output is then transmitted to the post processing stage.

According to paragraphs above, three thread-merging mechanisms are disclosed. The thread-merging mechanisms can be independently applied to the graphics-processing apparatus or applied to the graphics-processing apparatus together.

Figure 7:
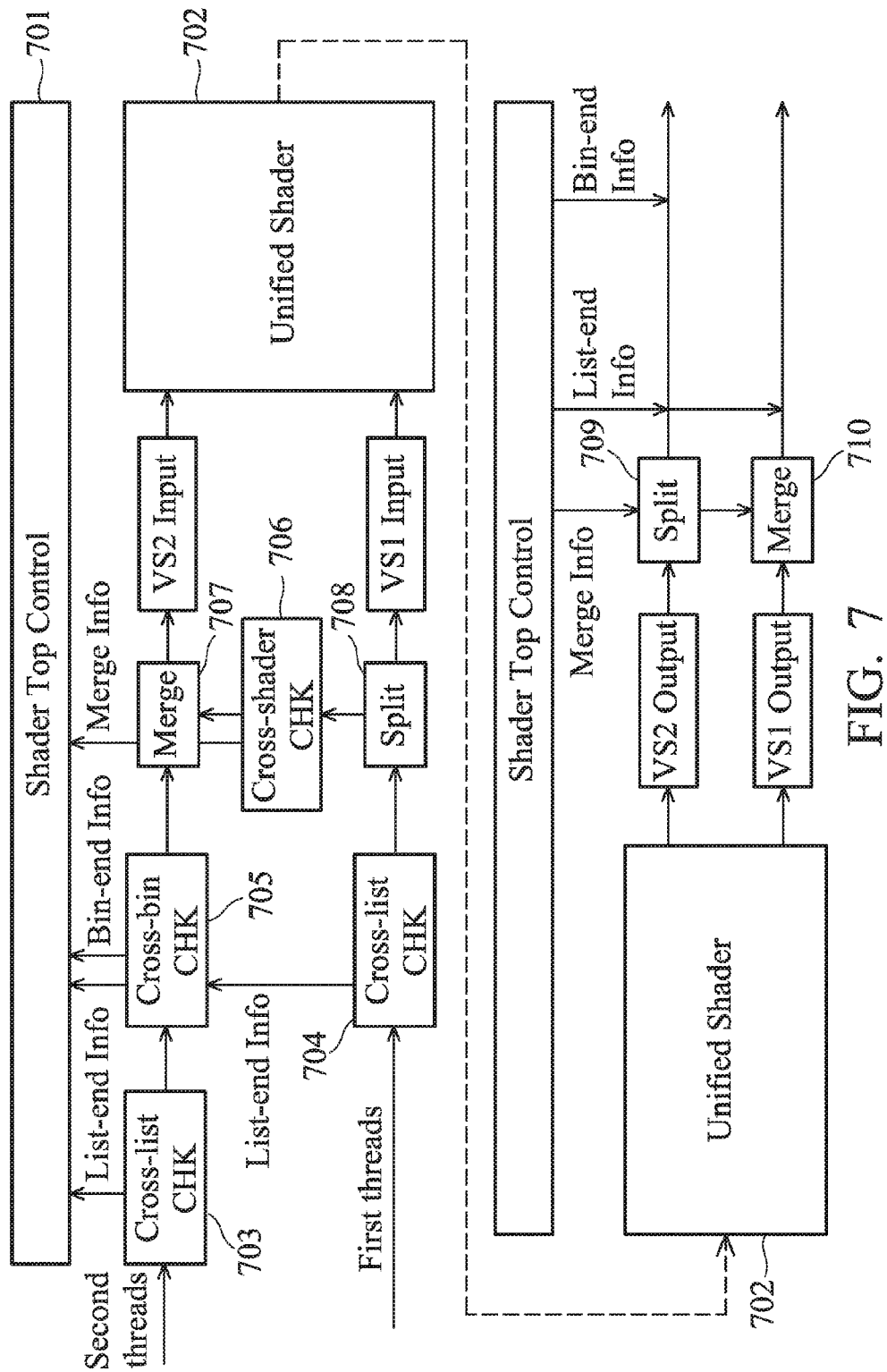
FIG. 7 is a proposed shader architecture of a graphics-processing apparatus according to another embodiment of the invention.

Please refer to FIG. 7. FIG. 7 is a proposed shader architecture of a graphics-processing apparatus according to another embodiment of the invention. The first cross-list checking module 703 receives second threads in different lists, and determines whether the second threads in different lists are mergeable. If any two threads among the second threads are mergeable according to the described cross-list thread merging mechanism and information of the second threads, the first cross-list checking module 703 transmits information of threads-to-be-merged to the shader top control 701 and the first merging module 707. The first cross-list checking module 703 further transmits list-end information to the shader top control 701 for the post processing. The first merging module 707 merges threads met the cross-list thread merging mechanism. In another embodiment, the first cross-list checking module 703 checks whether any two threads among the second threads are mergeable, and merges the two threads. Therefore, threads received by the cross-bin checking module 705 are processed threads. The step of threads merging can be implemented by the checking module, such as the first cross-list checking module 703 or the merging module, such as the first merging module 707. In the following paragraphs, the step of threads merging is illustrated with the merging module.

The cross-bin checking module 705 receives threads and determines whether the received threads met the cross-bin merging criteria described. If yes, the cross-bin checking module 705 transmits information of threads-to-be-merged to the shader top control 701 and the first merging module 707. The cross-bin checking module 70 further transmits list-end information to the shader top control 701 for the post processing.

The second cross-list checking module 704 receives first threads in different lists, and determines whether the first threads in different lists are mergeable. If any two threads among the first threads are mergeable according to the described cross-list thread merging mechanism and information of the first threads, the second cross-list checking module 704 transmits information of threads-to-be-merged to the shader top control 701 and the first merging module 707. The second cross-list checking module 704 further transmits list-end information to the shader top control 701 for the post processing.

The cross-shader checking module 706 checks whether the shader VS1 for processing VS1 input and the shader VS2 for processing VS2 input are mergeable according to the cross-shader merging mechanism described above. If yes, the first split module 708 splits a part of the first threads and transmits the part of the first threads to the first merging module 707. The first merging module 707 merges the received threads, including second threads (processed or original) and part of the first threads, to form the VS2 input. The remaining part of the first threads is formed as the VS1 input. Furthermore, the first merging module 707 transmits the information, labeled as Merge Info, related to the cross-shader merging mechanism to the shader top control unit 701.

After processing of the shader VS1 and the shader VS2, the VS2 output is transmitted to the second split module 709. If threads in different shader are merged, the second split module 709 splits the received VS2 output according to the merge information, labeled as Merge Info, and outputs the data corresponding to the part of the first threads to the second merging module 710. The second merging module merges the VS1 output and data received from the second split module 709 to generate output data corresponding to the first threads.

Figure 8:
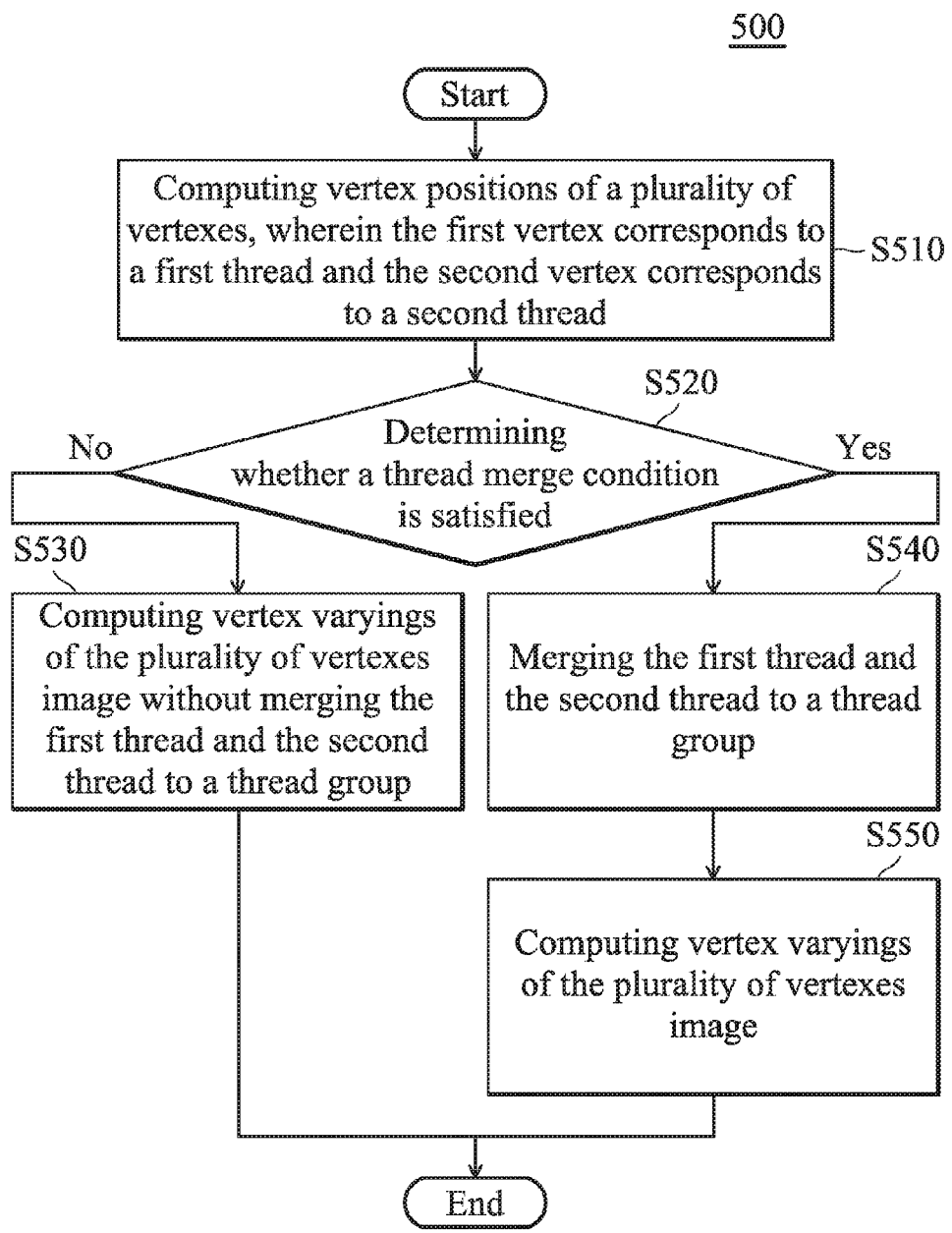
FIG. 8 is a flow chart illustrating the method 500 of a graphics-processing unit for tile-based rendering of a display area according to an embodiment of the invention.

FIG. 8 is a flow chart illustrating the method 500 of a graphics-processing unit (GPU) for tile-based rendering of a display area according to an embodiment of the invention. The method for assigning tasks is applied to the graphics-processing apparatus 100 or the shader architecture described in FIG. 6 and FIG. 7. First, in step S810, the graphics-processing apparatus may compute vertex positions of a plurality of vertexes, wherein the first vertex corresponds to a first thread and the second vertex corresponds to a second thread. In step S820, the graphics-processing apparatus may determine whether a thread merge condition is satisfied. The thread merge condition may be a cross-list merge condition, a cross-bin condition or a cross-shader condition described above. If the thread merge condition is not satisfied, step S830 will be performed. In step S830, the graphics-processing apparatus may compute vertex varyings of the plurality of vertexes without merging the first thread and the second thread to a thread group. If the thread merge condition is satisfied, step S840 will be performed. In step S540, the graphics-processing apparatus may merge the first thread and the second thread to a thread group. In step S850, the graphics-processing apparatus may compute vertex varyings of the plurality of vertexes, wherein when the first thread and the second thread are merged to the thread group, a varying of the first vertex and a varying of the second vertex are computed with respect to a program counter. In an embodiment of the invention, the graphics-processing apparatus may determine the thread merge condition is satisfied if the first thread and the second thread belong to the same draw call, or if a shader code assembly of the first thread is identical to a shader code assembly of the second thread and hardware settings of the first thread are identical to hardware settings of the second thread.

In the embodiment of the invention, the hardware settings of the first thread and the second thread each comprises at least one of the following: shader program instruction code, primitive type, input attribute type, output varying type, uniform memory organization, mathematical precision, rounding mode, performance hint, vertex buffer base, texture format, texture filtering, application process, standard application programming interface (API), and hardware global register settings.

In the embodiment of the invention, the method further comprises the step of recording the draw call information of the first thread and the draw call information of the second thread when determining that the thread merge condition is satisfied and the first thread and the second thread belong to different draw calls, and recording tile information of the first thread and tile information of the second thread when determining that the thread merge condition is satisfied and the first thread and the second thread correspond to different tiles of the display area. The tile information records merge information during cross-bin merge operation, and a post process operation uses the tile information to split the received data. Take FIG. 5 for example. In FIG. 5, the thread in block 505 and the thread in block 506 are merged, and the corresponding tile information is recorded. The tile information records bin-end information of the thread in block 505 such as shown in FIG. 7, and the post process operation splits the received data to generate data corresponding to the thread in block 505 and the thread in block 506 respectively according to the bin-end information.

In the embodiment of the invention, the method further comprises the step of determining whether to compute the vertex varyings of the plurality of vertexes in a binning phase or in a rendering phase so as to provide a determination result, wherein computing the vertex varyings of the plurality of vertexes is in the binning phase or in the rendering phase according to the determination result. In the embodiment of the invention, the varying of the first vertex is computed in either a binning phase or a rendering phase, and the varying of the second vertex is computed in the other of either the binning phase or the rendering phase if it is determined that the thread merge condition is not satisfied. In addition, the varying of the first vertex and the varying of the second vertex are computed in the rendering phase if it is determined that the thread merge condition is satisfied. In addition, in the embodiment of the invention, the method further comprises the step of recording a shading stage of the first thread and a shading stage of the second thread when determining that the thread merge condition is satisfied and the shading stage of the first thread is different from the shading stage of the second thread, wherein the shading stage of the first thread and the shading stage of the second thread each corresponds to either the binning phase or the rendering phase.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

Figure 9:
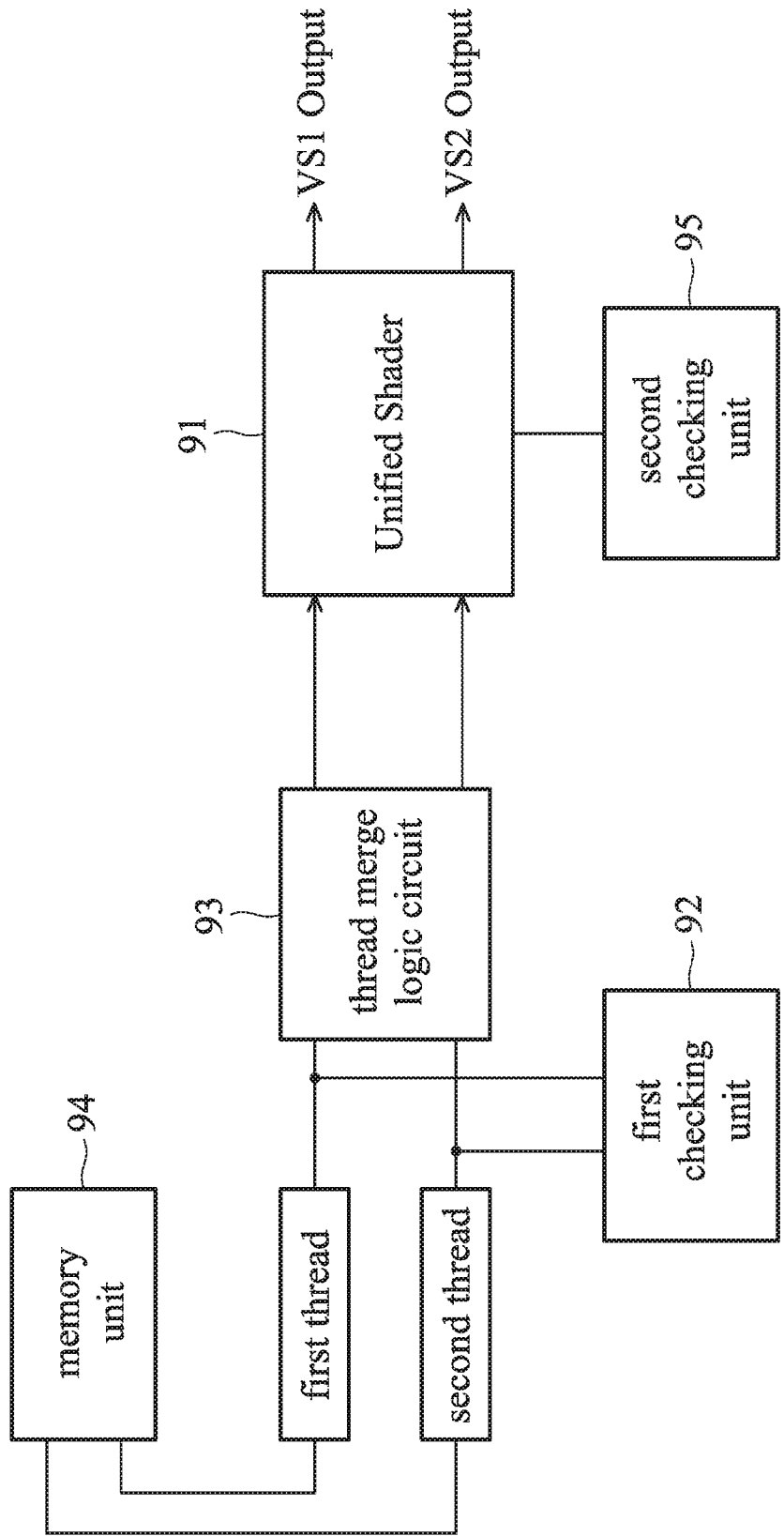
FIG. 9 is a schematic diagram of graphics-processing apparatus according to another embodiment of the invention.

FIG. 9 is a schematic diagram of graphics-processing apparatus according to another embodiment of the invention. The graphics-processing apparatus comprises a unified shader 91, a first checking unit 92, a thread merge logic circuit 93, a memory unit 94 and a second checking unit 95. The unified shader 91 plays roles of vertex shader, such as VS0, VS1 or VS2 in FIG. 4, in the binning phase or the rendering phase. The unified shader 91 computes vertex positions of a plurality of vertexes and compute the vertex varying of the plurality of vertexes, wherein a first vertex of the plurality of vertexes corresponds to a first thread and a second vertex of the plurality of vertexes corresponds to a second thread.

The first checking unit 92 determines whether a thread merge condition is satisfied. The detail of the thread merge conditions can be referred to FIG. 5 and corresponding paragraphs, wherein three thread-merging mechanisms are discussed above. When the thread merge condition is satisfied when the first thread and the second thread belong to the same draw call or when a shader code assembly of the first thread is identical to a shader code assembly of the second thread and hardware settings of the first thread are identical to hardware settings of the second thread.

The second checking unit 95 determines whether to compute the vertex varyings of the plurality of vertexes in a binning phase or in a rendering phase so as to provide a determination result, wherein the vertex shader computes the vertex varyings of the plurality of vertexes is in the binning phase or in the rendering phase according to the determination result.

The thread merge logic circuit 93 merge the first thread and the second thread to a thread group when the thread merge condition is satisfied, wherein when the first thread and the second thread are merged to the thread group, the at least one vertex shader computes a varying of the first vertex and a varying of the second vertex with respect to a program counter.

In this embodiment, the hardware settings of the first thread and the hardware settings of the second thread each comprises at least one of the following: shader program instruction code, primitive type, input attribute type, output varying type, uniform memory organization, mathematical precision, rounding mode, performance hint, vertex buffer base, texture format, texture filtering, application process standard application programming interface (API), and hardware global register settings.

The memory unit 94 records the draw call information of the first thread and the draw call information of the second thread when determining that the thread merge condition is satisfied and the first thread and the second thread belong to different draw calls.

The memory unit 94 further records a shading stage of the first thread and a shading stage of the second thread when the first checking unit determines that the thread merge condition is satisfied and the shading stage of the first thread is different from the shading stage of the second thread, wherein the shading stage of the first thread and the shading stage of the second thread each corresponds to either the binning phase or the rendering phase.

The memory unit 94 further records tile information of the first thread and tile information of the second thread when determining that the thread merge condition is satisfied and the first thread and the second thread correspond to different tiles of the display area.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method of a graphics-processing unit (GPU) for tile-based rendering of a display area, comprising:
    computing vertex positions of a plurality of vertexes, wherein a first vertex of the plurality of vertexes corresponds to a first thread and a second vertex of the plurality of vertexes corresponds to a second thread;
    determining whether a thread merge condition is satisfied;
    merging the first thread and the second thread to a thread group when determining that the thread merge condition is satisfied;
    computing vertex varyings of the plurality of vertexes, wherein when the first thread and the second thread are merged to the thread group, a varying of the first vertex and a varying of the second vertex are computed with respect to a program counter,
    wherein the thread merge condition is satisfied if:
    the first thread and the second thread belong to the same draw call; or
    a shader code assembly of the first thread is identical to a shader code assembly of the second thread and hardware settings of the first thread are identical to hardware settings of the second thread.

2. The graphics-processing method of claim 1, wherein the hardware settings of the first thread and the hardware settings of the second thread each comprises at least one of the following:
    shader program instruction code, primitive type, input attribute type, output varying type, uniform memory organization, mathematical precision, rounding mode, performance hint, vertex buffer base, texture format, texture filtering, application process standard application programming interface (API), and hardware global register settings.

3. The graphics-processing method of claim 1, wherein the first thread and the second thread belong to different draw calls or the first thread and the second thread belong to different tiles.

4. The graphics-processing method of claim 1, further comprising:
    recording a draw call information of the first thread and the draw call information of the second thread when determining that the thread merge condition is satisfied and the first thread and the second thread belong to different draw calls.

5. The graphics-processing method of claim 1, further comprising:
    recording tile information of the first thread and tile information of the second thread when determining that the thread merge condition is satisfied and the first thread and the second thread correspond to different tiles of the display area.

6. The graphics-processing method of claim 1, further comprising:
    determining whether to compute the vertex varyings of the plurality of vertexes in a binning phase or in a rendering phase so as to provide a determination result, wherein computing the vertex varyings of the plurality of vertexes is in the binning phase or in the rendering phase according to the determination result.

7. The graphics-processing method of claim 6, wherein the varying of the first vertex is computed in either a binning phase or a rendering phase, and the varying of the second vertex is computed in the other, either the binning phase or the rendering phase, if it is determined that the thread merge condition is not satisfied; and the varying of the first vertex and the varying of the second vertex are computed in the rendering phase, if it is determined that the thread merge condition is satisfied.

8. The graphics-processing method of claim 6, further comprising:
    recording a shading stage of the first thread and a shading stage of the second thread when determining that the thread merge condition is satisfied and the shading stage of the first thread is different from the shading stage of the second thread, wherein the shading stage of the first thread and the shading stage of the second thread each corresponds to either the binning phase or the rendering phase.

9. A graphics-processing apparatus, comprising:
    at least one vertex shader, configured to compute vertex positions of a plurality of vertexes and compute the vertex varying of the plurality of vertexes, wherein a first vertex of the plurality of vertexes corresponds to a first thread and a second vertex of the plurality of vertexes corresponds to a second thread; and
    a first checking unit, configured to determine whether a thread merge condition is satisfied, wherein the thread merge condition is satisfied when the first thread and the second thread belong to the same draw call or when a shader code assembly of the first thread is identical to a shader code assembly of the second thread and hardware settings of the first thread are identical to hardware settings of the second thread, a thread merge logic circuit, configured to merge the first thread and the second thread to a thread group when the thread merge condition is satisfied, wherein when the first thread and the second thread are merged to the thread group, the at least one vertex shader computes a varying of the first vertex and a varying of the second vertex with respect to a program counter.

10. The graphics-processing apparatus of claim 9, wherein the hardware settings of the first thread and the hardware settings of the second thread each comprises at least one of the following:

shader program instruction code, primitive type, input attribute type, output varying type, uniform memory organization, mathematical precision, rounding mode, performance hint, vertex buffer base, texture format, texture filtering, application process standard application programming interface (API), and hardware global register settings.

11. The graphics-processing apparatus of claim 9, wherein the first thread and the second thread belong to different draw calls or the first thread and the second thread belong to different tiles.

12. The graphics-processing apparatus of claim 9, further comprising:

a memory unit, configured to record the draw call information of the first thread and the draw call information of the second thread when determining that the thread merge condition is satisfied and the first thread and the second thread belong to different draw calls.

13. The graphics-processing apparatus of claim 12, wherein the memory unit is further configured to record tile information of the first thread and tile information of the second thread when determining that the thread merge condition is satisfied and the first thread and the second thread correspond to different tiles of the display area.

14. The graphics-processing apparatus of claim 9, further comprising:

a second checking unit, configured to determine whether to compute the vertex varyings of the plurality of vertexes in a binning phase or in a rendering phase so as to provide a determination result, wherein the vertex shader computes the vertex varyings of the plurality of vertexes is in the binning phase or in the rendering phase according to the determination result.

15. The graphics-processing apparatus of claim 14, wherein the varying of the first vertex is computed in either a binning phase or a rendering phase, and the varying of the second vertex is computed in the other, either the binning phase or the rendering phase, if it is determined that the thread merge condition is not satisfied, and the varying of the first vertex and the varying of the second vertex are computed in the rendering phase, if it is determined that the thread merge condition is satisfied.

16. The graphics-processing apparatus of claim 14, further comprising:

a memory unit, configured to record a shading stage of the first thread and a shading stage of the second thread when the first checking unit determines that the thread merge condition is satisfied and the shading stage of the first thread is different from the shading stage of the second thread, wherein the shading stage of the first thread and the shading stage of the second thread each corresponds to either the binning phase or the rendering phase.

* * * * *